(12) United States Patent
Tandur et al.

(10) Patent No.: US 12,010,469 B2
(45) Date of Patent: Jun. 11, 2024

(54) METHOD AND DEVICE FOR REMOTE MONITORING AND DIAGNOSIS OF FIELD EQUIPMENT

(71) Applicant: ABB Schweiz AG, Baden (CH)

(72) Inventors: Deepaknath Tandur, Bangalore (IN); Anitha Varghese, Bangalore (IN); Aravind Ingalalli, Bangalore (IN); Srijit Kumar, Bangalore (IN)

(73) Assignee: ABB Schweiz AG, Baden (CH)

( * ) Notice: Subject to any disclaimer, the term of this patent is extended or adjusted under 35 U.S.C. 154(b) by 254 days.

(21) Appl. No.: 17/264,329

(22) PCT Filed: Jul. 23, 2019

(86) PCT No.: PCT/IB2019/056271
§ 371 (c)(1),
(2) Date: Jan. 29, 2021

(87) PCT Pub. No.: WO2020/026070
PCT Pub. Date: Feb. 6, 2020

(65) Prior Publication Data
US 2021/0297755 A1 Sep. 23, 2021

(30) Foreign Application Priority Data
Jul. 31, 2018 (IN) .............................. 201841028692

(51) Int. Cl.
*H04L 67/12* (2022.01)
*H04Q 9/00* (2006.01)
*H04W 24/08* (2009.01)

(52) U.S. Cl.
CPC .............. *H04Q 9/00* (2013.01); *H04L 67/12* (2013.01); *H04W 24/08* (2013.01); *H04Q 2209/40* (2013.01)

(58) Field of Classification Search
CPC .. H04Q 9/00; H04Q 2209/40; H04Q 2209/86; H04L 67/12; H04L 67/60;
(Continued)

(56) References Cited

U.S. PATENT DOCUMENTS

| 10,491,459 | B1 * | 11/2019 | Andreas ................. H04W 24/08 |
| 2013/0107761 | A1 * | 5/2013 | Das ........................ H04W 84/18 370/255 |

(Continued)

FOREIGN PATENT DOCUMENTS

| CA | 2662415 C | * 9/2012 | ............. G06F 9/5011 |
| CN | 110351201 A | * 10/2019 | ......... H04L 47/2416 |

(Continued)

OTHER PUBLICATIONS

Indian Patent Office, First Examination Report for related IN 201841028692, dated Dec. 10, 2020, 7 pages.

(Continued)

*Primary Examiner* — Eyob Hagos
(74) *Attorney, Agent, or Firm* — Leydig, Voit & Mayer, Ltd.

(57) ABSTRACT

Disclosed is a method for remote diagnosis and monitoring of field equipment over an industrial wireless network. A diagnostic unit associated with the field equipment optimizes communication of measured data by a field radio device to a base station. The diagnostic unit is communicatively linked to the field radio device. The measured data is obtained from the field equipment, and a plurality of communication parameters of a communication channel are obtained based on communication from the field radio device. Based on a packet size, a data rate and required application responsiveness, one or more packets comprising the measured data are generated. The generated packets are communicated to the field radio device at selected time (Continued)

intervals based on the packet size, and the application responsiveness, for communication to the base station.

18 Claims, 3 Drawing Sheets

(58) Field of Classification Search
CPC ......... H04W 24/08; H04W 4/38; H04W 4/70; H04W 28/0236
See application file for complete search history.

(56) References Cited

U.S. PATENT DOCUMENTS

| | | | |
|---|---|---|---|
| 2015/0038110 A1* | 2/2015 | Zhu | H04L 41/5029 455/406 |
| 2017/0230907 A1* | 8/2017 | Rose | H03F 3/24 |
| 2019/0059116 A1* | 2/2019 | Crohas | H04B 17/318 |
| 2019/0200844 A1* | 7/2019 | Shelton, IV | H04L 63/1416 |
| 2019/0370146 A1* | 12/2019 | Babu | G06F 16/24545 |

FOREIGN PATENT DOCUMENTS

| | | | |
|---|---|---|---|
| EP | 1898560 A1 * | 3/2008 | ............ H04W 88/04 |
| EP | 1898560 A1 | 3/2008 | |
| EP | 3122061 A1 * | 1/2017 | ............. G01D 4/004 |
| EP | 2684399 B1 * | 5/2018 | ........... H04L 1/0025 |
| EP | 2684399 B1 | 5/2018 | |
| JP | 2015130626 A * | 7/2015 | |
| JP | 2015130626 A | 7/2015 | |
| WO | 2016156987 A1 | 10/2016 | |
| WO | WO-2019213979 A1 * | 11/2019 | ........... H04L 1/0083 |

OTHER PUBLICATIONS

European Patent Office, International Search Report for related PCT/IB2019/056271, dated Nov. 14, 2019, 3 pages.

European Patent Office, Written Opinion for related PCT/IB2019/056271, dated Nov. 14, 2019, 6 pages.

* cited by examiner

```
                ┌──────────────────────────────────────────────────┐
                │  Obtain a plurality of communication channel     │
                │  parameters used by a field radio device for     │──── 302
                │  communicating with a base station               │
                └──────────────────────────────────────────────────┘
                                        │
                                        ▼
                ┌──────────────────────────────────────────────────┐
                │  Obtain measured data associated with the field  │
                │  equipment for transmitting to the field radio   │──── 304
                │  device                                          │
                └──────────────────────────────────────────────────┘
                                        │
                                        ▼
                ┌──────────────────────────────────────────────────┐
                │  Generate one or more packets for transmission   │──── 306
                │  by the field radio device                       │
                └──────────────────────────────────────────────────┘
                                        │
                                        ▼
                ┌──────────────────────────────────────────────────┐
                │  Transmit the one or more packets to the field   │
                │  radio device for communication with the base    │──── 308
                │  station at selected time intervals              │
                └──────────────────────────────────────────────────┘
```

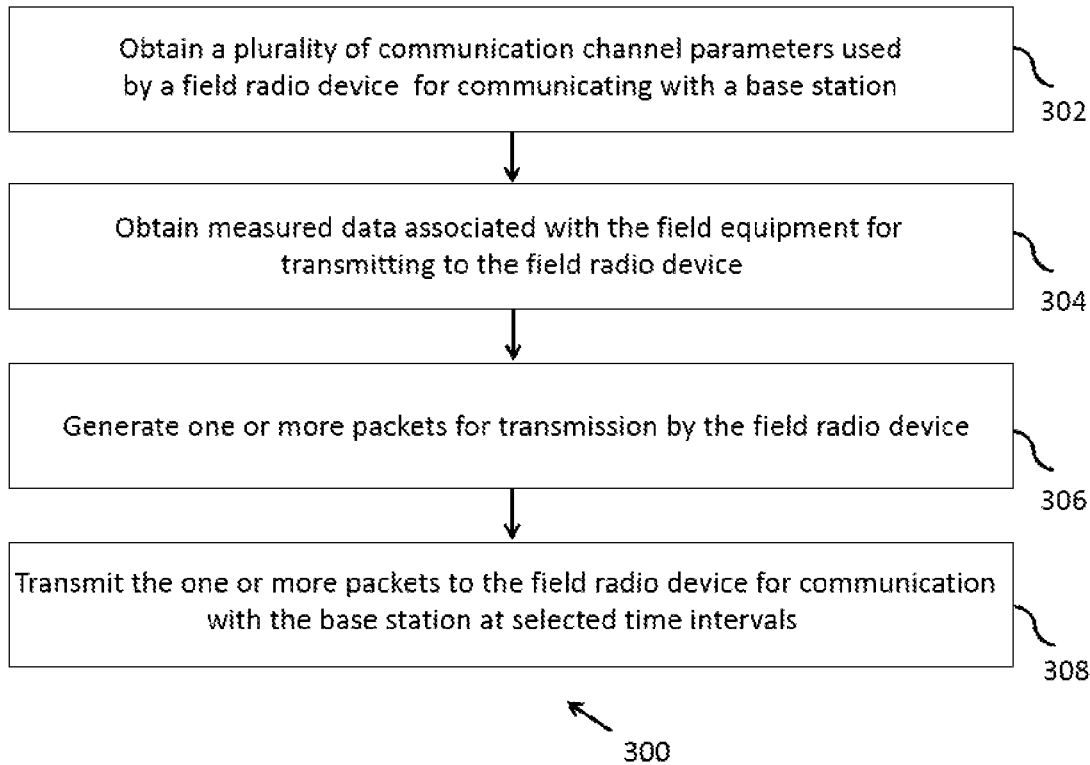

METHOD AND DEVICE FOR REMOTE MONITORING AND DIAGNOSIS OF FIELD EQUIPMENT

CROSS-REFERENCE TO RELATED APPLICATIONS

This application is a U.S. national stage of International Application Serial No. PCT/IB2019/056271, filed Jul. 23, 2019, which claims priority to Indian Patent Application No. 201841028692, filed Jul. 31, 2018. The entire disclosures of both of the foregoing applications are incorporated herein by reference.

FIELD OF THE INVENTION

The present invention relates generally to condition monitoring of field equipment. More particularly, the present invention relates to remote monitoring and diagnosis of field equipment via an industrial communication network.

BACKGROUND OF THE INVENTION

Remote diagnosis and monitoring for electric power systems enables maintenance teams to continuously supervise condition and performance of field equipment. To facilitate remote condition monitoring, diagnostic data, hereinafter referred to as measured data, associated with field equipment of a power system needs to be communicated on a continuous basis to remote control centers. Industrial wireless networks such as a low-power wide area networks (LPWANs) are leveraged to facilitate aforementioned communication between field equipment and remote control centers.

In a typical scenario, the measured data is communicated to a field radio device associated with the field equipment. The field radio device communicates with the remote control center via a long-range wireless base station (BS). The communication of the diagnostic data depends on a rate of transmission of data available to the field radio devices. Generally, the BS provides gradually reduced data rate/bandwidth as a distance to a field radio device increases from the BS.

Typically, the field radio devices are operated at a setting meant for a farthest possible distance from the BS. As a result, the field radio devices operate at a lowest data rate setting and access the wireless network as often as possible in order to complete the transmission of measured data. Hence, transmitting the measured data at the lowest data rate, not only fails to leverage the high data rate available for nearby field radio devices, but also results in excess network access.

Further, cost of operation per field device is based on the number of times the field radio device accesses the wireless network. In scenarios, where thousands of field radio devices are connected in a long-range network, an operation cost associated with frequent channel access communication becomes significant. Hence, transmitting the measured data at the lowest data rate, results in high operational cost.

In addition, industrial wireless networks such as LPWANs that operate in sub Giga Hertz (subGHz) spectrum have duty cycle restrictions. Depending on the operating spectrum, the field radio devices are expected to be in transmit mode for 1% to 10% of the transmission time. On completing the transmit mode, the field radio devices need to be silent for a period proportional to the transmit mode time, which in turn affects application responsiveness when a packet size of transmitted measured data is long. Accordingly, transmitting the measured data at the lowest data rate can affect the monitoring and diagnostic application.

Hence it is desired to have alternate methods for communication between the field radio devices and the BS for remote diagnosis and monitoring of field equipment of electric power systems.

SUMMARY OF THE INVENTION

The present invention provides a method for remote diagnosis and monitoring of field equipment of a power system. For purpose of remote diagnosis, the field equipment provides diagnostic data, hereinafter referred to as measured data, to a field radio device capable of communicating with a base station over an industrial wireless network such as low-power wide area network (LPWAN). The base station communicates the measured data to a remote control center responsible for performing condition monitoring of the field equipment. In an example, the base station may be a LPWAN gateway, and the remote control center may include an Internet of Things (IOT) application that communicates with the LPWAN gateway over a cloud network.

The method is performed with a diagnostic unit associated with the field equipment. The diagnostic unit may be an Intelligent Electronic Device (IED), sensor, or a diagnostic unit provided with a smart circuit breaker. Alternately, the diagnostic unit may be a dedicated unit provided for obtaining and communicating data associated with field equipment such as circuit breaker, wherein such field equipment do not have capability to communicate data over the industrial wireless network. The diagnostic unit obtains the measured data from the field equipment. The diagnostic unit is communicatively linked to the field radio device. The method includes, obtaining a plurality of parameters of a communication channel used by the field radio device for communicating with the base station. The plurality of parameters comprises a packet size, a data rate, a Received Signal Strength Indicator (RSSI) and a duty cycle. At least a first parameter of the plurality of parameters is estimated with at least a second parameter of the plurality of parameters. For example, the first parameter includes the packet size and the data rate and the second parameter may include the RSSI and the duty cycle.

Typically, the plurality of parameters of the communication channel such as the data rate, and the packet size depend on a distance of the field radio device from the base station (BS). For example, a field device located at 300 meters from the BS may be provided with a data rate of 50 kbps and a packet size of 250 medium access control (MAC) layer units, while the same field device located at 2 kilometers (kms) may be provided with a data rate of 1-2 kbps and a packet size of 123 MAC units, and at 10 kms with 0.25 kbps and 59 MAC units respectively.

The method further includes, obtaining, by the diagnostic unit, the measured data from the field equipment, for transmitting to the field radio device. The measured data may include an operation data, a sensor data and estimated data associated with operation of the field equipment. The operation data may include event data, which may be generated in response to an event association with the field equipment. In an example, the field equipment is a circuit breaker and the diagnostic unit is communicatively linked with the circuit breaker for obtaining a measured data.

Based on the packet size, the data rate and application responsiveness required for the application (measured data), one or more packets are generated by the diagnostic unit. Typically, the measured data is buffered in a storage, hereinafter referred to as a buffer, associated with the diagnostic unit. For generating the one or more packets, an amount of the measured data that can be accommodated in each packet of the one or more packets is determined according to the application responsiveness.

Typically, the application responsiveness is determined in terms of a time of generation of an event, for example an alarm, at the field equipment, to the time the event is processed and a severity of the event is diagnosed at the remote control center. The application responsiveness is available with the diagnostic unit, and is selected as one of a first time period and a second time period according to the operation data comprising the event data. Accordingly, if the operation data comprises event data corresponding to an alarm event, the application responsiveness required would be a shorter period in comparison to when the operation data comprises data apart from event data.

Further, based on the obtained duty cycle, the field radio device can be in a transmit mode for predefined time period (TimeOnAir) of a transmission time. For example, the field radio device can be in a transmit mode for 1% to 10% of the time. Upon transmitting the packet the field radio device needs to be in a silent mode for a time period $Toff_{subband}=$ $(Time_{OnAir}/Duty\ Cycle)-Time_{OnAir}$. If the packet size is large, the communication channel is blocked for a longer duration, thereby affecting the application responsiveness. Thus the size of a generated packet is fixed so as to limit the time the communication channel is blocked, and maintain the required application responsiveness.

The one or more packets are transmitted to the field radio device for communication to the base station at selected time intervals, wherein the time intervals are selected on the packet size, the data rate and the application responsiveness. The time intervals selected are minimum time intervals available with the field radio device for transmitting the one or more packets when the operation data includes the event data. For example, if the operation data includes data apart from event data, then the time interval is chosen based on a selected packet size and a time interval applicable for the selected packet size. However, if the operation data includes event data, then the measured data is sent without buffering to the field radio device and the minimum time interval available is chosen for transmitting the event data.

During generation of the one or more packets, at least one packet of the one or more packets comprises the RSSI (and/or other link quality parameters), for condition monitoring of a connection between the field radio device and the base station. The RSSI is typically a wireless link quality indicator that enables a recipient such as the control center or the IOT application to predict or troubleshoot a missing data condition. Further, the at least one packet of the one or more packets comprises a schedule of transmission of the measured data. The schedule enables the recipient to determine a time of arrival of a next packet from the field radio device. Thus non-receipt of the next packet at the determined time of arrival may indicate a failure of the field radio device or failure of the communication between the field radio device and the base station.

In accordance with an embodiment, the diagnostic unit comprises a plurality of modules, each of which performs one or more steps of the method. In one embodiment, the diagnostic unit comprises a first input interface, a second input interface, a packet generation module, an output interface and a buffer. The modules are implemented with a processor(s) of the diagnostic unit. For example, the modules may be implemented with a diagnostic unit such as an IED of a medium voltage equipment such as a switchgear. In another example, the modules may be implemented within a device such as a smart circuit breaker.

The first input interface obtains a plurality of parameters of a communication channel used by the field radio device for communicating with the base station, wherein the plurality of parameters comprises packet size, data rate, Received Signal Strength Indicator (RSSI) and duty cycle. Here, the first input interface may get some parameters (e.g. RSSI, duty cycle) from the field radio device, and derive some parameters (e.g. packet size, data rate) using the received parameters. The second input interface, may obtain measured data associated with the field equipment for transmitting to the field radio device, wherein the measured data comprises one or more of operation data, event data, sensor data and estimated data associated with operation of the field equipment. For example, the second input interface may receive the measured data from a current sensor, an auxiliary voltage sensor and/or a temperature sensor coupled to the field equipment. The measured data can also have processed data, wherein the processing is performed by the diagnostic unit.

The buffer stores the measured data (as required) received from the second input interface unit and outputs the measured data at a predefined rate to the packet generation module. In an embodiment, the buffer is a memory external to the diagnostic unit and is communicatively coupled to the second input interface and packet generation module. In another embodiment, the buffer is included within the diagnostic unit. The packet generation module generates one or more packets for transmission by the field radio device based on the packet size and the data rate available for transmission, and application responsiveness required for the measured data. For event data corresponding to events and alarms, the required application responsiveness is usually higher, thereby resulting in generation of a smaller packet size compared to packet sizes generated for measured data that does not have event data. The output interface transmits the one or more packets to the field radio device for communication to the base station at selected time intervals that are selected based on the packet size, the data rate and the application responsiveness.

BRIEF DESCRIPTION OF DRAWINGS

FIG. 3 is a flowchart of a method for remote diagnosis and monitoring of field equipment, according to an embodiment of the present invention.

FIGS. 4A, and 4B are tables illustrating a plurality of parameters of a communication channel in an example wireless industrial network.

FIG. 5 is a flow diagram illustrating generation of one or more packets for remote diagnosis and monitoring of field equipment, according to an embodiment of the present invention.

DETAILED DESCRIPTION

The present invention provides a method for remote diagnosis and monitoring of field equipment with a diagnostic unit that is associated with the field equipment. The diagnostic unit may be an Intelligent Electronic Device (IED), sensor, or a diagnostic unit provided with a smart circuit breaker. Alternately, the diagnostic unit may be a dedicated unit provided for obtaining and communicating data associated with field equipment such as circuit breaker, wherein such field equipment do not have capability to communicate data over the industrial wireless network. The diagnostic unit is communicatively linked to a field radio device capable of communicating with a base station (BS) over an industrial wireless network. The diagnostic unit obtains diagnostic data, hereinafter referred to as measured data, of the field equipment, which needs to be communicated to the BS via the field radio device. The BS communicates the measured data to a remote server (e.g. IOT application) that is configured to remotely diagnose and monitor the field equipment based on the measured data.

Disclosed method generates packets for transmission of the measured data by the field radio device based on a plurality of communication channel parameters and required application responsiveness. The plurality of communication channel parameters include a packet size, a data rate, a Received Signal Strength Indicator (RSSI) and a duty cycle, applicable at a distance the field radio device exists from the BS. The application responsiveness is determined by the diagnostic unit based on existence of event data within the measured data. Disclosed packet transmission, improves efficiency of transmitting data by the field radio device regardless of any change in location of the field radio device, or changes in the industrial wireless network.

Disclosed method is implemented with the diagnostic unit associated with the field equipment. The diagnostic unit may be coupled internally or externally with the field equipment. In an embodiment, the field equipment is a circuit breaker and the diagnostic unit is associated with the circuit breaker for obtaining the measured data.

Figure 1:
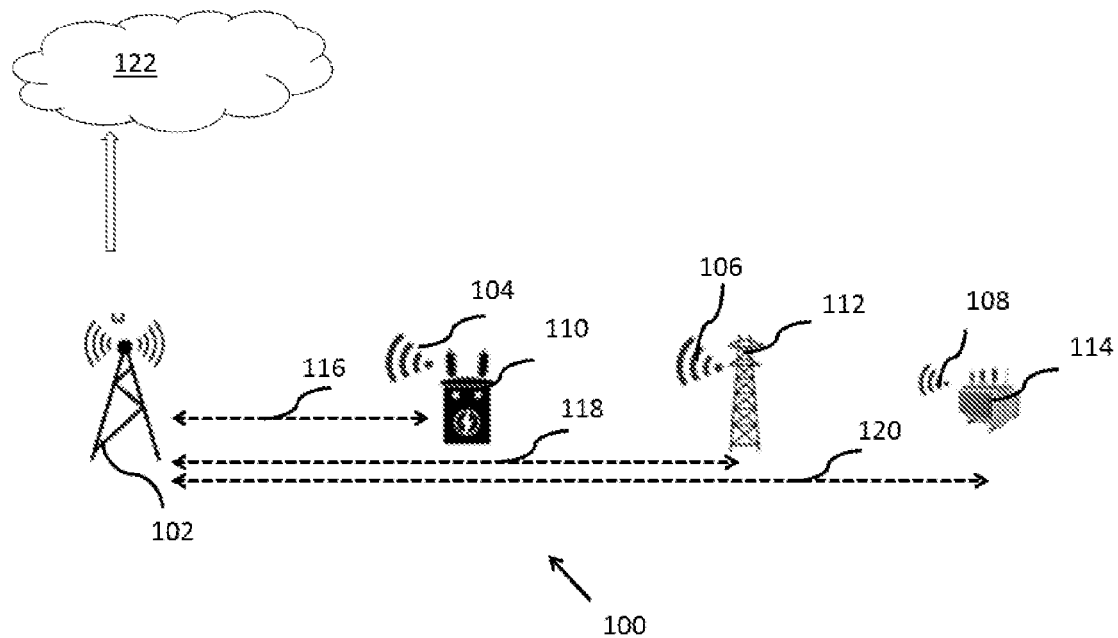
FIG. 1 is a simplified view of an industrial wireless network in which various embodiments of the present invention can be practiced.

Various embodiments of the present invention can be practiced in an environment such as environment 100 shown in FIG. 1. The environment 100 shown in FIG. 1 depicts an industrial wireless network having a base station (BS) (102) in communication with three field radio devices (104, 106, 108), that are communicatively linked to diagnostic units (not shown) associated with respective field equipment (110, 112, 114). Though the environment 100 herein depicts three field radio devices, it is understood the present invention is operable with thousands of field radio devices. Alternatively, the present invention is operable using a single field radio device. Accordingly, the present invention can be implemented with one field equipment, two field equipment or multiple field equipment.

FIG. 1 shows, the field radio device 104 at a distance 116 from the BS, the field radio device 106 at a distance 118, and the field radio device 108 at a distance 120 from the BS. Since the field radio devices are collocated with the field equipment, the distance between the field equipment and the BS is the same as the distance between the corresponding field radio device and the BS. As an example, in a distribution network, the distance of a field radio device from a BS will depend on a location of a recloser, or a circuit breaker switch to which the field radio device is connected to.

Generally, a field radio device that is closer to the BS is provided with larger packet size and higher data rate for transmission than a field radio device farther from the BS. For example, in a low power wide area network (LPWAN) the distance 118 of the field radio device 104 may be 300 meters, and the data rate available at 300 meters may be 50 kbps, while for the field device 106 present at the distance 120 of 2 km the data rate available may be 1.7 kbps, and for the field device 108 present at 10 kms the data rate available may be 0.25 kbps. Accordingly, the packet size available for the field radio device 104 is 250 Medium Access (MAC) Layer units, while the packets size available for the field radio device 106 is 123 MAC Units, and for the field radio device 108 is 59 MAC Units.

In prior art, each field radio device (for example, 104, 106, and 108) is configured to work at a lowest possible data rate available viz. 0.25 kbps for consistency. However, such transmission may result in waste of available data rate for nearby field radio devices viz. 104 and 108. Thus a diagnostic unit (not shown) associated with the field equipment (for example, 104, 106 or 108) optimizes use of an available data rate, and packet size to generate packets based on measured data received from the field equipment (for example, 104, 106 or 108) and a required application responsiveness for the application (the measured data). The diagnostic unit is explained in reference to FIG. 2

Figure 2:
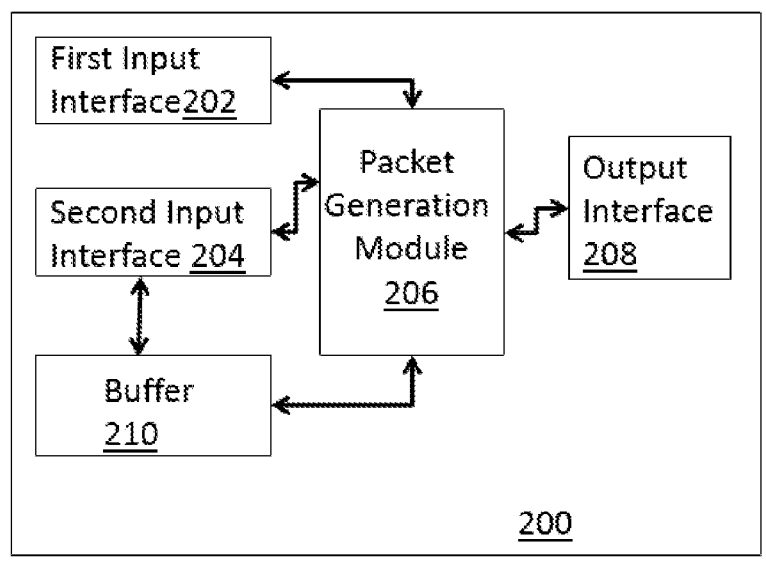
FIG. 2 is a block diagram of a diagnostic unit to facilitate remote diagnosis and monitoring of field equipment, according to an embodiment of the present invention.

FIG. 2 is a block diagram of a diagnostic unit (200). Instances of the diagnostic unit (200) is associated with each field equipment (110, 112 and 114). Instances of the diagnostic unit (200) facilitates remote diagnosis and monitoring of field equipment (for example, 110, 112 and 114), wherein instances of the diagnostic unit (200) is communicatively linked to the field radio device (104, 106 and 108 respectively) associated with the field equipment (110, 112 and 114). The field radio device (104, 106, 108) is capable of communicating with a base station (for example 102) over an industrial wireless network. The diagnostic unit (200) includes a plurality of modules such as a first input interface (202), a second input interface (204), a packet generation module (206), an output interface (208), and a buffer (210)x. Each of the plurality of modules of the diagnostic unit (200) performs one or more steps of a method disclosed in FIG. 3.

FIG. 3 is a flowchart 300 illustrating a method for remote diagnosis and monitoring of field equipment (for example 114) with a diagnostic unit (for example 200) associated with the field equipment (114) over an industrial wireless network (for example the industrial wireless network shown in FIG. 1), in accordance with an embodiment. The diagnostic unit (200) is communicatively linked to the field radio device (108) that is capable of communicating with the base station (102) over the industrial wireless network.

In step 302, a plurality of parameters of a communication channel, used by the field radio device (e.g. 108) for communicating with the base station, is obtained by the diagnostic unit (e.g. 200). In an embodiment, the plurality of parameters include a packet size, a data rate, a Received Signal Strength Indicator (RSSI) and a duty cycle. In an embodiment, at least a first parameter of the plurality of parameters is estimated with at least a second parameter of the plurality of parameters. For example, the packet size is estimated from the RSSI and the duty cycle. Similarly, the data rate is estimated from the RSSI and the duty cycle.

As a result, the communication channel parameters available at the distance (e.g. 120) the field equipment (e.g. 114) exists from the BS (102) is obtained from the diagnostic unit. For example, in a LoRA LPWAN, if the field equipment is at 10 kms from the BS, the data rate available may be 0.25 kbps and the packet size available for transmission may be 59 b MAC Units.

In step 304, the measured data associated with the field equipment for transmitting to the field radio device is obtained by the diagnostic unit. The measured data includes an operation data, a sensor data or an estimated data associated with operation of the field equipment. In an example, the sensor data may include a plurality of parameters related to an operation of the field equipment and detected by a plurality of sensors coupled to the field equipment, such as a current sensor, temperature sensor and an auxiliary voltage sensor. In another example, the operation data may include event data corresponding to events such as an alarm or serious fault concerning the field equipment. Alternately, operation data may include data associated with operation (e.g. switching data for a circuit breaker).

The measured data received from the second input interface unit can be stored in the buffer (210) as required. The buffer (210) is a memory storage that can store a predefined amount of data, before providing it to the packet generation module (206) for generating packets for transmission. In an example, the buffer is an external storage coupled to the diagnostic unit.

In step 306, one or more packets for transmission by the field radio device are generated by the diagnostic unit. The packet size and the data rate available for transmission, and application responsiveness required for the measured data, determine the generation of the one or more packets.

Typically, the application responsiveness is determined in terms of a time of generation of an event, for example an alarm, at the field equipment, to the time the event is processed and a severity of the event is diagnosed at the remote control center. The application responsiveness is available with the diagnostic unit, and is selected as one of a first time period and a second time period according to the operation data comprising the event data. Accordingly, if the operation data comprises event data corresponding to an alarm event, the application responsiveness required would be a shorter period in comparison to when the operation data comprises data apart from event data.

Further, based on the obtained duty cycle, the field radio device can be in a transmit mode for predefined time period (TimeOnAir) of a transmission time. For example, the field radio device can be in a transmit mode for 1% to 10% of the time. Upon transmitting the packet the field radio device needs to be in a silent mode for a time period $\text{Toff}_{subband} = (\text{Time}_{onAir}/\text{Duty Cycle}) - \text{Time}_{OnAir}$. If the packet size is large, the communication channel is blocked for a longer duration, thereby affecting the application responsiveness. Thus the size of a generated packet is fixed such as to limit the time the communication channel is blocked, and maintain the required application responsiveness.

Figures 4B, 5:
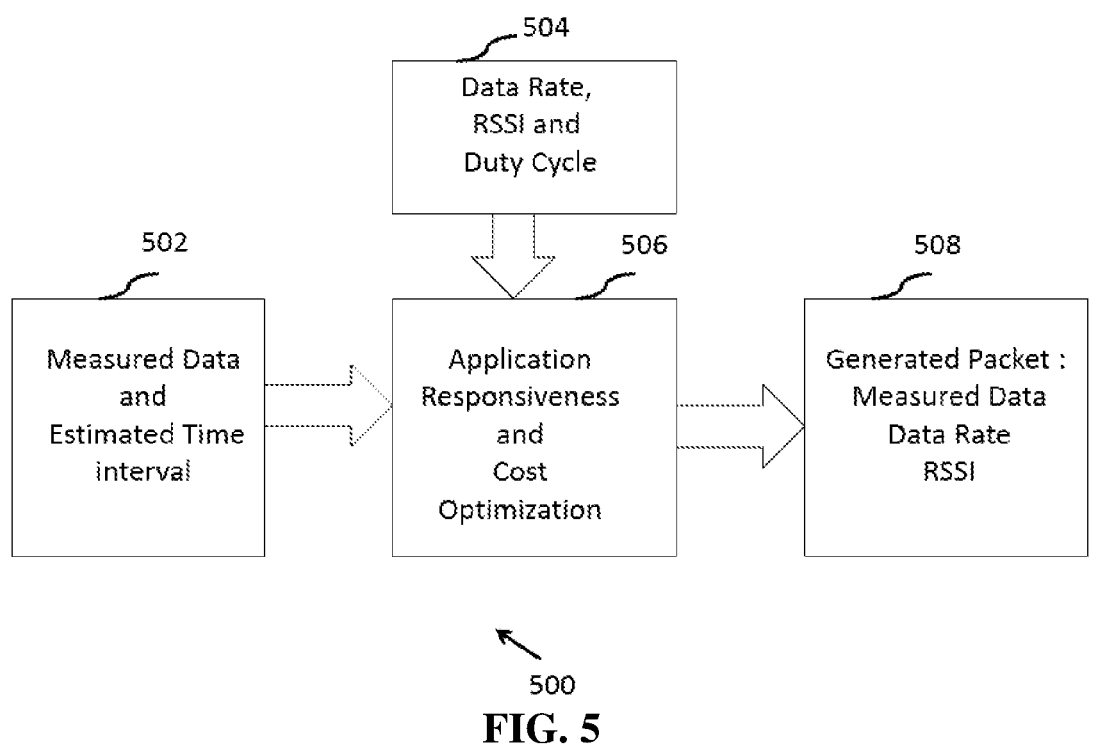

For example, if the measured data of 20 MAC units is received every hour from the field equipment, then the one or more packets generated would be based on the available data rate and packet size at the field device. In an example, where the industrial wireless network is a LoRA LPWAN, reference is sought to available channel parameters as shown in FIGS. 4A and 4B.

FIG. 4A is a table 400A mapping available physical data rates 406 to a configuration of LoRA 404. Further each physical data rate is designated by a symbolic data rate 402. For example, a data rate 406a of 250 bps is mapped to a symbolic data rate 402a of 0. Similarly, a data rate 406b of 440 bps is mapped to a symbolic data rate 404a of 1. In order to determine a packet size available for a symbolic data rate, reference is sought to table 400B. Table 400B illustrates available packet sizes 410 for symbolic data rates 402. For example, the symbolic data rate 402a of 0 has a packet size 410a of 59 MAC Units. Hence, for the field device (108) present at 10 kms from the BS (102) available data rate is 250 bps and packet size is 59 MAC Units.

Further, for the measured data of 20 MAC Units, the packet generation module (206) may obtain the measured data two times from the buffer to accommodate 40 MAC units within the available packet size of 59 MAC units. Thus the field radio device transmits the measured data once in every two hours. In contrast, for the field radio device located at distance 116 of 300 meters, the available data rate may be 50 kbps. For the data rate of 50 Kbps, upon reading table 400A and 400B together, the packet size available is 250 MAC units. In this case, the packet generation module (206) can accommodate about 12 measurements from the buffer amounting to 249 Units, within a single packet (or single packet transmission). Accordingly, the field radio device may transmit the packet once in every 12 hours.

The packet generation module (206) facilitates buffering of the measured data within the buffer (210) until an entire packet size available is occupied. In an example, where size of the measured data exceeds the packet size available, the measured data is split into portions, where each portion is accommodated within a packet available for transmission. Further, the packets accommodating the split portions are identified in sequence by including a continuity indicator within each packet. In another example, where the measured data can be accommodated within a maximum packet size available, including the entire measured data within such packet generates the packet.

The packet generation module (206) may add RSSI or link quality indicator and a schedule of transmission within the packet. For example, in the case where 40 MAC Units of measured data occupy 59 MAC units of the packet, the remaining 19 MAC units may be utilized for indicating the RSSI and the schedule of transmission of packets. For example, a time instance of transmitting a next packet may be provided within the schedule of transmission of packets. The schedule helps a recipient control center or an IOT application to know when the next packet is expected to arrive from the field radio device (for example 104).

In step 308, the one or more packets are transmitted by the output interface (208) to the field radio device (for example 108) for communication to the base station (BS) at selected time intervals. The time intervals are selected on the packet size, the data rate and the application responsiveness. The application responsiveness is determined in terms of a time of generation of an event, for example an alarm, at the field equipment, to the time the event is processed and a severity of the event is diagnosed at the remote control center. The application responsiveness is available with the diagnostic unit, and is selected as one of a first time period and a second time period according to the operation data comprising the event data.

Accordingly, if the operation data comprises event data corresponding to an event, the application responsiveness required would be a shorter period in comparison to when the operation data comprises data apart from event data. In an embodiment, if the operation data includes event data corresponding to an event occurring with the field equipment, then a minimum time interval available for transmission is selected, and the measured data including the event data is communicated without buffering.

FIG. 5 illustrates a flow diagram 500 illustrating generation of one or more packets by the packet generation module (206), according to an embodiment. At 502, the measured data and an estimated time interval of receiving the measured data from the field equipment (or stored in buffer (210)) is received by the packet generation module (206). At 504, the channel parameters such as duty cycle, the RSSI and the data rate are obtained with communication from the field radio device. At 506, taking into consideration required application responsiveness and a cost of communication, one or more packets for communication are generated. At 508, a generated packet is shown to include the measured data, the data rate and the RSSI.

Thus the invention can be used to efficiently format and packetize measured data associated with field equipment for transmission to an intended recipient, such as a control center or a remote IOT application. The control center or IOT application may be a remote monitoring solution communicatively coupled to the base station over a cloud network. Further, as a cost of operation of per field radio device is based on a number of times the field radio device accesses the communication channel as well as a respective handle in a cloud hub, optimizing communication of the field radio devices that minimizes the communication channel access helps optimizing an overall cost of operation.

We claim:

1. A method for remote diagnosis and monitoring of field equipment with a diagnostic unit associated with the field equipment, wherein the diagnostic unit is communicatively linked to a field radio device-capable of communicating with a base station over an industrial wireless network, the method comprising:
    obtaining a plurality of parameters of a communication channel used by the field radio device for communicating with the base station,
    wherein the plurality of parameters comprises packet size, data rate, Received Signal Strength Indicator (RSSI) and duty cycle, wherein at least a first parameter of the plurality of parameters is estimated with at least a second parameter of the plurality of parameters;
    obtaining measured data associated with the field equipment for transmitting to the field radio device, wherein the measured data comprises one or more of operation data, sensor data and estimated data associated with operation of the field equipment;
    generating one or more packets for transmission by the field radio device based on the packet size and the data rate available for transmission, and application responsiveness required for the measured data, wherein the application responsiveness is determined based on the operation data comprising event data, wherein a generated packet size of the generated one or more packets is determined based on the application responsiveness, wherein the event data comprises a time of a generation, at the field equipment, of a packet communicating an event datum of the field equipment and a time of processing, by the base station, of the packet communicating the event datum of the field equipment, and wherein the application responsiveness is further determined based on:
    an elapsed time between the generation, at the field equipment, of the packet communicating the event datum of the field equipment and the time of processing, by the base station, of the packet communicating the event datum of the field equipment; and
    transmitting the one or more packets to the field radio device for communication to the base station at selected time intervals, wherein the time intervals are selected based on the packet size, the data rate and the application responsiveness.

2. The method of claim 1, wherein the packet size and the data rate are determined from the RSSI and the duty cycle.

3. The method of claim 1, wherein at least one packet of the one or more packets comprises the RSSI, for condition monitoring of a connection between the field radio device and the base station.

4. The method of claim 1, wherein the time intervals selected are minimum time intervals available with the field radio device for transmitting the one or more packets when the operation data includes the event data.

5. The method of claim 1, wherein the application responsiveness is available with the diagnostic unit, and is selected as one of a first time period and a second time period according to the operation data comprising the event data.

6. The method of claim 1, wherein generating the one or more packets comprises determining an amount of the measured data that can be accommodated in each packet of the one or more packets according to the application responsiveness.

7. The method of claim 6, wherein at least one packet of the one or more packets comprises a schedule of transmission of the measured data.

8. The method of claim 1, wherein the field equipment is a circuit breaker and the diagnostic unit is communicatively linked with the circuit breaker for obtaining the measured data.

9. The method of claim 1, wherein the generated packet size is further determined based on the data rate available for transmission.

10. A diagnostic unit to facilitate remote diagnosis and monitoring of field equipment, wherein the diagnostic unit is communicatively linked to a field radio device capable of communicating with a base station over an industrial wireless network, wherein the diagnostic unit comprises:
    a first input interface configured to:
        obtain a plurality of parameters of a communication channel used by the field radio device for communicating with the base station, wherein the plurality of parameters comprises packet size, data rate, Received Signal Strength Indicator (RSSI) and duty cycle, wherein at least a first parameter of the plurality of parameters is estimated with at least a second parameter of the plurality of parameters;
    a second input interface configured to:
        obtain measured data associated with the field equipment for transmitting to the field radio device, wherein the measured data comprises one or more of operation data, event data, sensor data and estimated data associated with operation of the field equipment;
    a packet generation module to:
        generate one or more packets for transmission by the field radio device based on the packet size and the data rate available for transmission, and application responsiveness required for the measured data, wherein the application responsiveness is determined based on the operation data comprising event data, wherein a generated packet size of the generated one or more packets is determined based on the application responsiveness, wherein the event data comprises a time of a generation, at the field equipment, of a packet communicating an event datum of the field equipment and a time of processing, by the base station, of the packet communicating the event datum of the field equipment, and wherein the application responsiveness is further determined based on:
        an elapsed time between the generation, at the field equipment, of the packet communicating the event datum of the field equipment and the time of processing, by the base station, of the packet communicating the event datum of the field equipment; and an output interface to:
transmit the one or more packets to the field radio device for communication to the base station at selected time intervals, wherein the time intervals are selected based on the packet size, the data rate and the application responsiveness.

11. The diagnostic unit of claim 10, further comprising:
a buffer to store the measured data received from the second input interface.

12. The diagnostic unit of claim 10, wherein the packet size and the data rate are determined from the RSSI and the duty cycle.

13. The diagnostic unit of claim 10, wherein at least one packet of the one or more packets comprises the RSSI, for condition monitoring of a connection between the field radio device and the base station.

14. The diagnostic unit of claim 10, wherein the time intervals selected are minimum time intervals available with the field radio device for transmitting the one or more packets when the operation data includes the event data.

15. The diagnostic unit of claim 10, wherein the application responsiveness is selected as one of a first time period and a second time period according to the operation data comprising the event data.

16. The diagnostic unit of claim 10, wherein the second input interface is further configured to generate the one or more packets based on determining an amount of the measured data that can be accommodated in each packet of the one or more packets according to the application responsiveness.

17. The diagnostic unit of claim 16, wherein at least one packet of the one or more packets comprises a schedule of transmission of the measured data.

18. The diagnostic unit of claim 10, wherein the field equipment is a circuit breaker and the diagnostic unit is communicatively linked with the circuit breaker for obtaining the measured data.

* * * * *